Aug. 6, 1957     F. V. TOHOLSKY     2,801,543
HYDRAULICALLY ACTUATED GYROSCOPE
Filed July 9, 1954
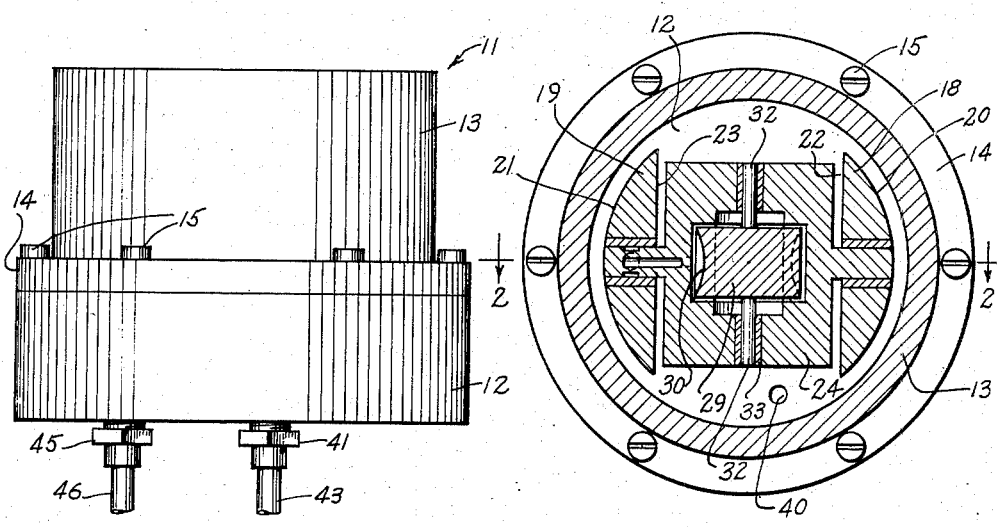
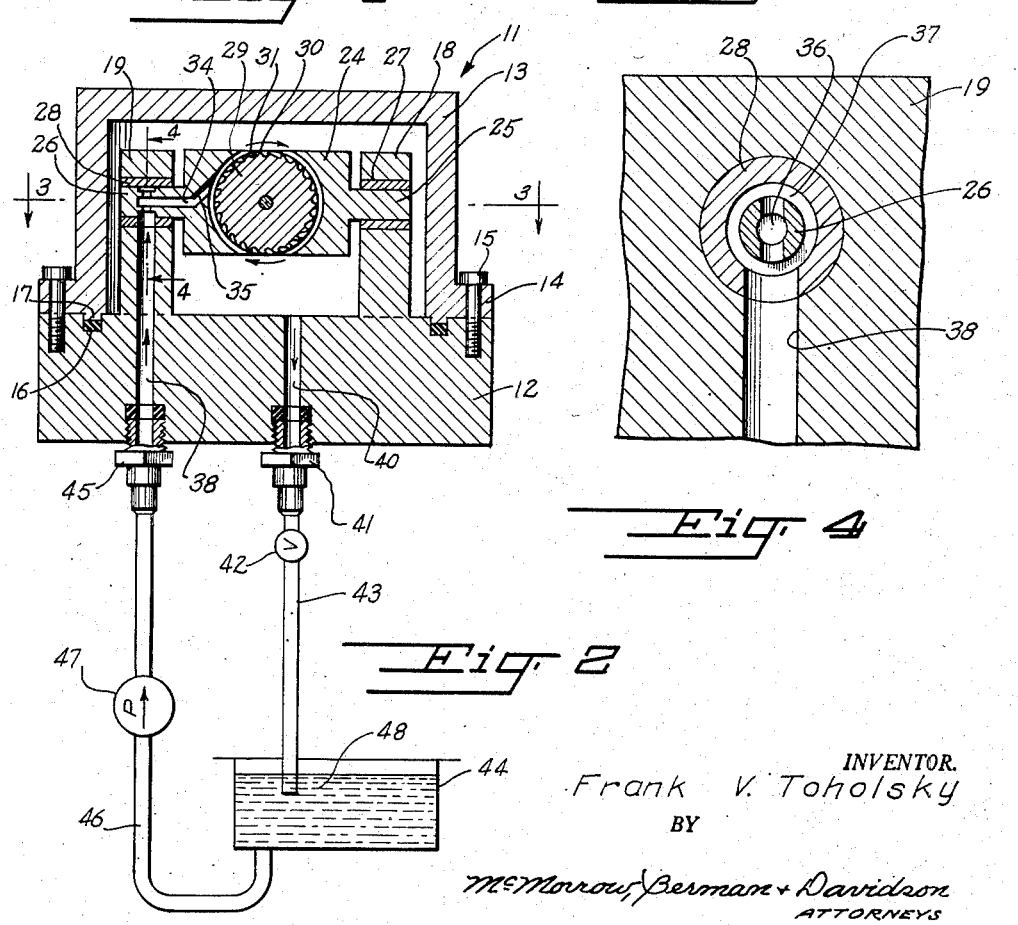
INVENTOR.
Frank V. Toholsky
BY
McMorrow, Berman + Davidson
ATTORNEYS

United States Patent Office 2,801,543
Patented Aug. 6, 1957

2,801,543

HYDRAULICALLY ACTUATED GYROSCOPE

Frank V. Toholsky, Baltimore, Md.

Application July 9, 1954, Serial No. 442,240

3 Claims. (Cl. 74—5.7)

This invention relates to gyroscope devices, and more particularly to an improved hydraulically actuated gyroscope.

The main object of the invention is to provide a novel and improved hydraulically actuated gyroscope, said gyroscope being simple in construction, being compact in size, and being stable in operation.

A further object of the invention is to provide an improved hydraulically actuated gyroscope which is relatively inexpensive to manufacture, which is self cooling, whereby the operation of the gyroscope is substantially independent of ambient temperature, which is self lubricating, whereby wear of the moving parts thereof is minimized, and which is operable for long periods without deterioration.

Further objects and advantages of the invention will become apparent from the following description and claims, and from the accompanying drawings, wherein:

Figure 1 is an elevational view of an improved hydraulically actuated gyroscope constructed in accordance with the present invention;

Figure 2 is a vertical cross sectional view taken through the gyroscope on the line 2—2 of Figure 3;

Figure 3 is a horizontal cross sectional view taken through the gyroscope on the line 3—3 of Figure 2; and Figure 4 is an enlarged cross sectional detail view taken on line 4—4 of Figure 2.

Referring to the drawings, the improved gyroscope is designated generally at 11 and comprises a closed housing having the generally circular base portion 12 and the cover portion 13, said cover portion having the annular bottom flange 14 which is engageable on the peripheral portion of the base 12 and which may be secured by the fastening bolts 15, as shown in Figures 1, 2 and 3. An annular sealing gasket 16 is provided in an annular groove provided in the base 12, said sealing gasket being engaged by an annular rib 17 formed on the bottom surface of the cover member 13, the rib 17 fitting into the annular groove containing the gasket 16 and exerting pressure on the gasket to provide a tight seal between the cover member 13 and the base 12.

The base member 12 is formed with the parallel upstanding supports 18 and 19, said supports having arcuate outer surfaces 20 and 21, as shown in Figure 3, which are spaced from and concentric with the inside cover member 13. The inner vertical surfaces 22 and 23 of the upstanding support elements 18 and 19 are flat and parallel, as shown in Figure 3.

Designated at 24 is a hollow, generally cylindrical rotor member having the opposite axially extending gimbal portions 25 and 26 rotatably received in respective bearings 27 and 28 mounted in the upstanding support members 18 and 19, the rotational axis of the rotor member 24 being perpendicular to the flat inside surfaces 22 and 23 of the support members 18 and 19. Journaled in the rotor member 24 on an axis perpendicular to the axis of said rotor member 24 is a second rotor 29 which is generally cylindrical in shape and which is formed on its cylindrical surface with longitudinally extending arcuate recesses 30 defining vanes 31 therebetween.

As shown in Figure 3, the second rotor 29 is provided with the axially extending gimbal portions 32 rotatably supported in bearings 33 provided in the first rotor member 24.

The first rotor member 24 is formed with a passage 34 which extends tangentially relative to the second rotor 29, as shown at 35. The passage 34 extends through the gimbal portion 26 and communicates with a transverse passage through the gimbal portion, as shown at 36. The transverse passage 36 communicates with an annular groove 37 formed in the gimbal member 26, said annular groove being in communication with a vertical passage 38 extending through the support member 19 and through the base element 12, as shown in Figure 2.

As above explained, the passage portion 35 opens into the interior of the first rotor member 24 in a direction extending substantially tangential to the second rotor member 29.

The base member 12 is formed with a passage 40 which is provided with a suitable conduit fitting 41. Connected to the conduit fitting 41 through a control valve 42 is a conduit 43 which discharges into a liquid reservoir 44. The passage 38 is provided with a suitable conduit fitting 45. A conduit 46 connects the bottom portion of the reservoir 44 to the conduit fitting 45, the conduit 46 being provided with a pump 47 for building up the pressure of the hydraulic fluid 48 furnished by the reservoir 44 before said fluid is injected into the gyroscope device 11.

In operation, the hydraulic fluid is circulated by the pump 47 through the passage 38 and through the passage 34 into the cavity of the first rotor member 24, engaging the vanes 31 on the second rotor 29 and causing the second rotor to be driven in a clockwise direction, as viewed in Figure 2, at a speed depending upon the rate of flow of the hydraulic fluid. The spent fluid fills the interior of the gyroscope housing and acts as a damping means for the moving parts therein.

The stream of hydraulic fluid directed against the vanes 31 causes the rotor 29 to rotate at a relatively high speed. The pressure of the fluid in the housing is governed by the size of the output passage 40, the conduit 43, and the adjustment of the valve 42, as well as by the pressure of the fluid in the inlet conduit 46.

When the device is made in relatively small sizes, the recesses 30 may be omitted, since sufficient driving action will be obtained by the discharge of the hydraulic fluid against the surface of the second rotor to rotate said second rotor, even if said surfaces are relatively smooth.

It will be noted that the gyroscope is self cooling, since there is a continuous circulation of the hydraulic fluid therethrough, whereby heat is constantly removed from the bearing surfaces of the device. Similarly, the circulation of the hydraulic fluid through the device provides continuous lubrication of the bearing surfaces, such lubrication being assured by the filling of the interior of the housing by the expended hydraulic fluid after said hydraulic fluid has given up its kinetic energy to drive the rotor 29. The continuous flow of the hydraulic fluid likewise prevents accumulation of dirt or grit in the bearings of the device, thus minimizing wear of the moving parts thereof. A still further advantage obtained by the above device is that not only is the life of the bearings increased but the hysteresis losses and other frictional losses normally developed by the action of the rotors with relation to their supports are reduced, as over previously known gyroscopes.

As above explained, the recesses 30 may be omitted in the case of small gyroscopes, whereby the rotor member 29 will be driven by the viscous drag of the hydraulic fluid which is tangentially projected on the periphery of the rotor 29 from the passage portion 35. Thus, the construction of smaller gyroscopes is simplified when said gyroscopes are made in accordance with the present invention, rather than becoming more complex, as in the case of electrically driven gyroscopes.

The hydraulically actuated gyroscope above described can be made a direct drive for a control valve for another hydraulic system. This control valve can be in the same case and part of the gimbal shaft of the gyroscope.

An electrically operated torque motor can be housed in the cover member 13 to make the unit work in a closed loop servo system. Electrically operated sensing units of several types can be employed to remove information from the hydraulic gyroscope and can be housed in the cover. The continuous flowing hydraulic fluid under these conditions will also serve to remove the heat created by the electrical system inside the cover 13 without affecting the gyroscope operation in any way.

As above explained, damping of the movement of the gyroscope parts is accomplished by permitting the spent hydraulic fluid to fill the gyroscope housing. By properly adjusting the valve 42, the housing can be maintained full of the spent hydraulic fluid, and the pressure of the fluid in the housing can be regulated so as to obtain the desired damping of the gyroscope.

While a specific embodiment of an improved gyroscope device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A gyroscope device comprising a closed housing, a pair of supports in said housing, a hollow first rotor journaled in said supports for rotation around an axis perpendicular to said supports, a second rotor journaled in said first rotor on an axis in a plane which is constantly perpendicular to the axis of said first rotor, one of said supports being formed with a passage, said first rotor being formed with a passage communicating with said first named passage and opening within said first rotor tangentially relative to the outer peripheral surface of said second rotor, a liquid reservoir, a pump, and respective conduit means connecting said liquid reservoir and pump respectively to said first named passage and the interior of said housing, the interior of said housing being in free communication with the interior of said first rotor.

2. A gyroscope device comprising a closed housing, a pair of supports in said housing, a hollow first rotor journaled in said supports for rotation around an axis perpendicular to said supports, a second rotor journaled in said first rotor on an axis in a plane which is constantly perpendicular to the axis of said first rotor, one of said supports being formed with a passage, said first rotor being formed with a passage communicating with said first named passage and opening within said first rotor tangentially relative to the outer peripheral surface of said second rotor, said surface being formed with longitudinal recesses defining vanes therebetween, a liquid reservoir, a pump, and respective conduit means connecting said liquid reservoir and pump respectively to said first named passage and the interior of said housing, the interior of said housing being in free communication with the interior of said first rotor.

3. A gyroscope device comprising a closed housing, a pair of upstanding, parallel supports in said housing, a hollow first rotor journaled on said supports for rotation around an axis perpendicular to said supports and to the base of the housing, a second rotor journaled in said first rotor on an axis in a plane which is constantly perpendicular to the axis of said first rotor, one of said supports being formed with a passage, said first rotor being formed with a passage, said last named passage extending through a journal portion of said first rotor and communicating with said first named passage, said last named passage opening within said first rotor tangentially relative to the outer peripheral surface of said second rotor, said surface being formed with longitudinal recesses defining vanes therebetween, a liquid reservoir, a pump, and respective conduit means connecting said liquid reservoir and pump respectively to said first named passage and the interior of said housing through the base thereof, the interior of said housing being in free communication with the interior of said first rotor.

References Cited in the file of this patent

UNITED STATES PATENTS

| | | |
|---|---|---|
| 2,053,183 | Crane et al. | Sept. 1, 1936 |
| 2,345,915 | Carlson | Apr. 4, 1944 |
| 2,380,578 | Carlson | July 31, 1945 |

FOREIGN PATENTS

| | | |
|---|---|---|
| 564,783 | Great Britain | Oct. 12, 1944 |